United States Patent
Adhya et al.

(10) Patent No.: US 9,578,003 B2
(45) Date of Patent: Feb. 21, 2017

(54) DETERMINING WHETHER TO USE A LOCAL AUTHENTICATION SERVER

(71) Applicant: Aruba Networks, Inc., Sunnyvale, CA (US)

(72) Inventors: Tilak Adhya, Bangalore (IN); Sandeep Unnimadhavan, Bangalore (IN); Shanta Patil, Bangalore (IN); Santashil PalChaudhuri, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 104 days.

(21) Appl. No.: 14/446,551

(22) Filed: Jul. 30, 2014

(65) Prior Publication Data
US 2016/0036794 A1 Feb. 4, 2016

(51) Int. Cl.
*H04L 29/06* (2006.01)
*H04W 12/06* (2009.01)

(52) U.S. Cl.
CPC .............. *H04L 63/08* (2013.01); *H04W 12/06* (2013.01); *H04L 63/108* (2013.01); *H04L 63/164* (2013.01)

(58) Field of Classification Search
CPC ...... H04L 63/08; H04L 63/108; H04L 63/164; H04W 12/06; H04W 12/08
USPC ....................................... 726/4, 2, 26, 27, 29
See application file for complete search history.

(56) References Cited

U.S. PATENT DOCUMENTS

| | | | |
|---|---|---|---|
| 7,174,456 B1* | 2/2007 | Henry | H04L 63/0428 380/247 |
| 7,308,502 B2* | 12/2007 | Rouault | H04L 41/06 709/227 |
| 7,752,450 B1* | 7/2010 | Palmer | G06F 21/31 713/183 |
| 9,124,570 B1* | 9/2015 | Asher | H04L 63/08 |
| 2007/0101418 A1* | 5/2007 | Wood | G06F 21/31 726/8 |
| 2009/0187983 A1* | 7/2009 | Zerfos | H04L 63/0823 726/10 |
| 2011/0314532 A1* | 12/2011 | Austin | H04L 9/3213 726/8 |
| 2014/0105094 A1* | 4/2014 | Soundararajan | H04W 48/16 370/312 |
| 2015/0121500 A1* | 4/2015 | Venkatanaranappa | H04L 63/0815 726/8 |
| 2015/0264055 A1* | 9/2015 | Budhani | H04L 63/0281 726/4 |

* cited by examiner

*Primary Examiner* — Sarah Su
(74) *Attorney, Agent, or Firm* — Brooks, Cameron & Huebsch, PLLC

(57) ABSTRACT

The present disclosure discloses a method and a system for determining whether to use a local authentication server. Specifically, a first network device executing a first authentication server receives a request for authentication from a client device. The first network device determines whether the client device was previously successfully authenticated by a second authentication server executing on a second network device within a particular period of time. If so, the first network device attempts to authenticate the client device using the first authentication server. Otherwise, the first network device declines the request for authentication from the client device.

22 Claims, 6 Drawing Sheets

DETERMINING WHETHER TO USE A LOCAL AUTHENTICATION SERVER

FIELD

Embodiments of the present disclosure relate to network security in wireless local area networks. In particular, embodiments of the present disclosure describe a method and network device for determining whether to use a local authentication server based on a prior successful authentication by a remote authentication server.

BACKGROUND

In a large enterprise wireless local area network (WLAN) deployment with branch offices, the authentication servers often are located at a central location (e.g., the headquarter) that is remote to the branch offices. However, if the network connection between network devices at the branch office and those at the headquarter office (or data center) is down, then existing client devices at the branch offices will not be able to be authenticated due to the inaccessibility of the authentication server. Thus, even if a client device requires only local or Internet access, the network still will be unavailable for the client device during the down time of the network connection between the branch office and the headquarter office.

Moreover, with the technique of Transport Layer Security (TLS), a network administrator can revoke a particular user's network access by adding a Certificate Revocation List (CRL) entry for the particular user to the existing certificate. Nevertheless, continuous addition of CRL can significantly increase the size of existing certificate, and therefore revoking a single user's network access may become unsustainable for an embedded system.

DETAILED DESCRIPTION

In the following description, several specific details are presented to provide a thorough understanding. While the context of the disclosure is directed to network security in wireless local area networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to network security in wireless local area networks. In particular, embodiments of the present disclosure describe a method and network device for determining whether to use a local authentication server based on a prior successful authentication by a remote authentication server.

With the solution provided herein, a first network device executing a first authentication server receives a request for authentication from a client device. The first network device determines whether the client device was previously successfully authenticated by a second authentication server executing on a second network device within a particular period of time. If so, the first network device attempts to authenticate the client device using the first authentication server. Otherwise, the first network device declines the request for authentication from the client device.

Network Environment

Figure 1:
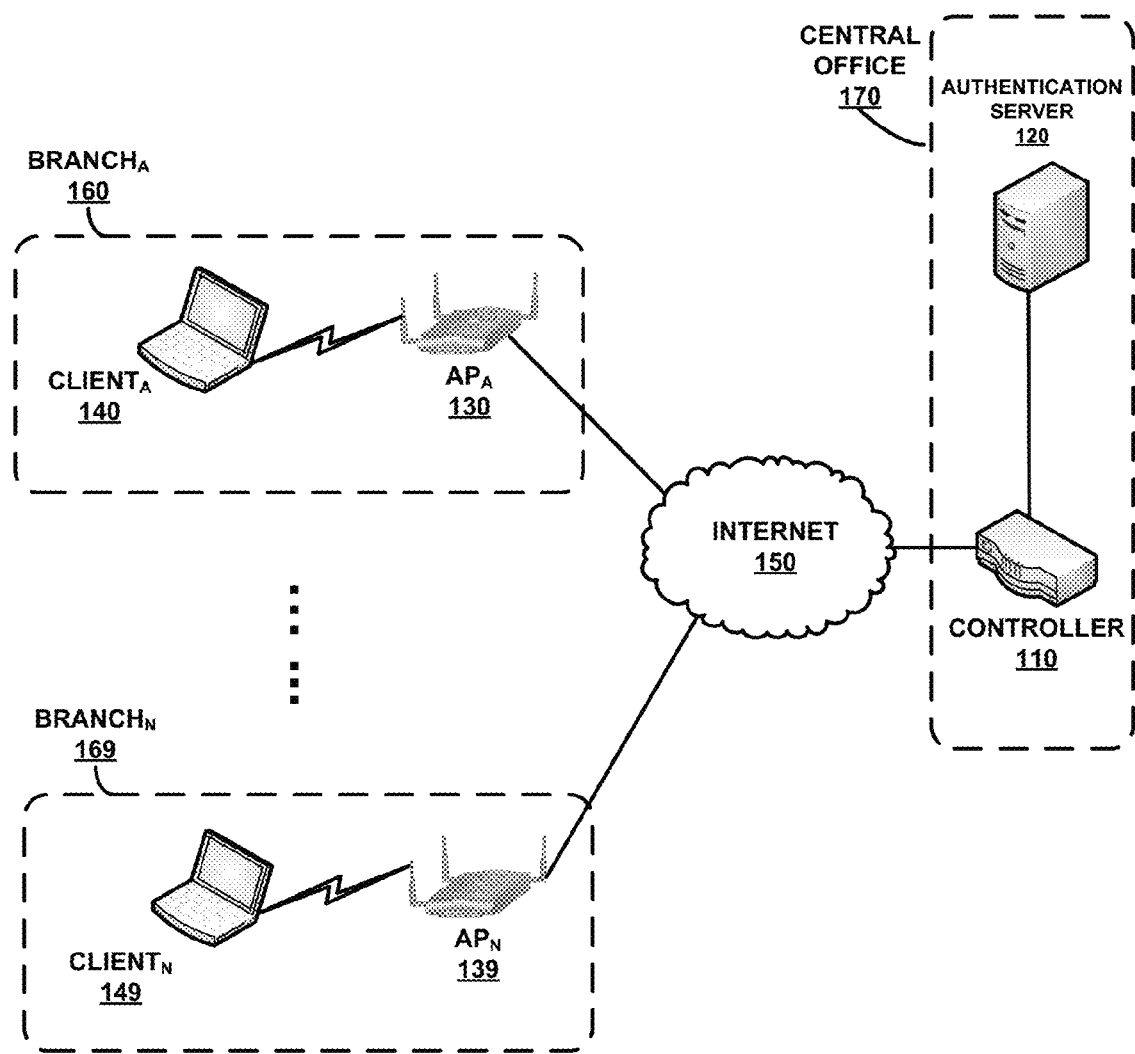
FIG. 1 shows an exemplary network environment according to embodiments of the present disclosure.

FIG. 1 shows an exemplary network environment according to embodiments of the present disclosure. Specifically, FIG. 1 illustrates a network that is deployed in at least a central office 170 and a number of branch offices, such as Branch$_A$ 160, ... Branch$_N$ 169. Typically, branch offices are located physically remote from central office 170. As such, network devices at each branch office may be connected to network devices at central office 170 via Internet 150. The network at central office 170 includes at least a controller 110 and an authentication server 120. The network at each of the branch offices includes one or more access points (APs) and one or more client devices. For example, in Branch$_A$ 160, the network includes at least AP$_A$ 130 and Client$_A$ 140 that is associated with AP$_A$ 130. As another example, in Branch$_N$ 169, the network includes at least AP$_N$ 139 and Client$_N$ 149 that is associated with AP$_N$ 139.

Network controller 110 generally refers to a controlling device that manages other network devices such as wireless access points. Network controller 110 may handle automatic adjustments to radio frequency power, wireless channels, wireless authentication, and/or security. Furthermore, network controller 110 can be combined to form a wireless mobility group to allow inter-controller roaming. Network controller 110 can be part of a mobility domain to allow clients access throughout large or regional enterprise facility locations. This saves the clients time and administrators overhead because it can automatically re-associate or re-authenticate.

Authentication server 120 generally provides a network service that applications use to authenticate the credentials, e.g., account names and passwords, of their users. When a client device (e.g., Client$_A$ 140) submits a valid set of credentials, the client device receives a cryptographic proof that it can subsequently use to access various services within the network. The authentication process often is used as the basis for (a) authorization, which refers to the determination of whether a privilege shall be granted to a particular user or process; (b) privacy, which keeps information from becoming known to non-participants; and, (c) non-repudiation, which is the inability to deny having done something that was authorized to be done based on the authentication.

In some embodiments, authentication server 120 may use a Remote Authentication Dial In User Service (RADIUS) protocol RADIUS generally refers to a networking protocol that provides centralized Authentication, Authorization, and Accounting (AAA) management for users that connect and use a network service.

Access point 130 generally refers to a wireless network device that allows wireless client devices to connect to a wired network using IEEE 802.11 or related standards. The APs usually connect to a router via a wired network, but can also be an integral component of the router itself. Each access point serves one or more client devices.

In some embodiments, the connection between a client device and/or an AP at a branch office and a controller at a central office uses the TLS protocol. Specifically, the client device may indicate to the server (e.g., controller 110) the setup of a TLS connection, for example, by using a particular port number for TLS connections, or request that the server (e.g., controller 110) to switch the connection to TLS using a protocol-specific mechanism. Once the client device or the AP and controller have agreed to use the TLS, they negotiate a stateful connection by using a handshaking procedure, during which the client device or the AP and the controller agree on various parameters used to establish the connection's security.

During operations, a mobile client device (e.g., $Client_A$ 140) may transmit a user credential to the AP (e.g., $AP_A$ 130) that the client device is associated with at the branch office (e.g., $Branch_A$ 160) for authentication. The AP then sends the user credential to controller 110 at central office 170. Subsequently, controller 110 forwards the user credential to a centralized authentication server 120 for authentication. If the user credential is successfully authenticated, authentication serer 120 will send a message to controller 110 indicating that the client device is successfully authenticated. Controller 110 will transmit a message to $AP_A$ 130 indicating that $Client_A$ 140 is successfully authenticated, as well as what level of access to network resources shall be granted to the client device.

Local Authentication Server

Figure 2:
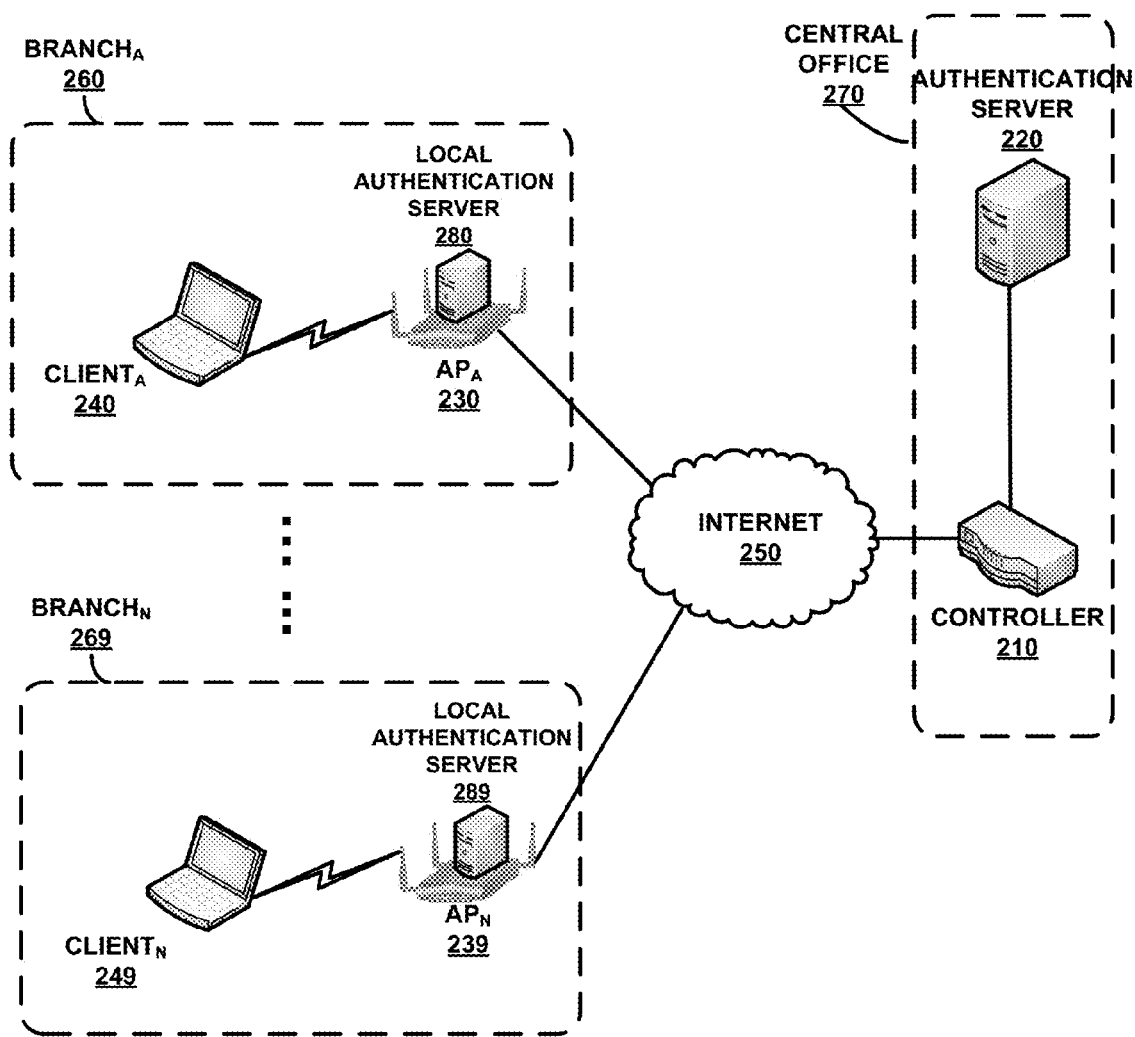
FIG. 2 shows an exemplary network environment according to embodiments of the present disclosure.

FIG. 2 shows an exemplary network environment according to embodiments of the present disclosure. Specifically, FIG. 2 illustrates a network that is deployed in at least a central office 270 and a number of branch offices, such as $Branch_A$ 260, . . . $Branch_N$ 269. Typically, branch offices are located physically remote from central office 270. As such, network devices at each branch office may be connected to network devices at central office 270 via Internet 250. The network at central office 270 includes at least a controller 210 and an authentication server 220. The network at each of the branch offices includes one or more access points (APs) and one or more client devices. For example, in $Branch_A$ 260, the network includes at least $AP_A$ 230 and $Client_A$ 240 that is associated with $AP_A$ 230. As another example, in $Branch_N$ 269, the network includes at least $AP_N$ 239 and $Client_N$ 249 that is associated with $AP_N$ 239. Moreover, each access point at a branch office can act as a local authentication server for the branch office, such as local authentication server 280 at $Branch_A$ 260 to local authentication server 289 at $Branch_N$ 269. In some embodiments, one of the APs at a particular branch can be self-elected as a virtual controller to manage other APs at the same branch. The AP that acts as the virtual controller is also referred to as a "master AP." The master AP having a local authentication server can receive user authentication information from authentication server 220 at central office 270, and forward the information to other APs in the branch.

A. Authentication Credentials

For any successful authentication of a client device at a branch by an external authentication server, the external authentication server will return a certificate to the client device.

The authentication process may support, for example, Challenge-Handshake Authentication Protocol (CHAP) and/or Transport Layer Security (TLS). CHAP authenticates a user or network host to an authenticating entity. That entity may be, for example, an Internet service provider. CHAP provides protection against replay attacks by the peer through the use of an incrementally changing identifier and of a variable challenge-value. Both the client device and the server may share the knowledge of a secret that is not sent over the network.

TLS generally refers to a cryptographic protocol for providing communication security over the Internet. TLS typically uses X.509 certificates and hence asymmetric cryptography to authenticate the counterparty with whom they are communicating, and to exchange a symmetric key. This session key is then used to encrypt data flowing between the parties. This allows for message confidentiality, message integrity, and message authentication. Specifically, the authentication process may use an Extensible Authentication Protocol (EAP-TLS). With EAP-TLS, the authenticator typically sends an EAP-Request/Identity packet to the peer, and the peer will respond with an EAP-Response/Identity packet to the authenticator, containing the peer's user identifier. From this point forward, while nominally the EAP conversation occurs between the EAP authenticator and the peer, the authenticator may act as a pass-through device, with the EAP packets received from the peer being encapsulated for transmission to a backend authentication server.

In the operation of some cryptosystems involving public key infrastructures (PKIs), a certificate revocation list (CRL) is often used. The CRL generally refers to a list of client identifiers corresponding to certificates that have been revoked. Therefore, a client device presenting a revoked certificate associated with an identifier appearing in the CRL should no longer be trusted. The same CRL is shared at the central office as well as all branch offices. Therefore, for every revoked user, a corresponding serial number will be added to the CRL. Over time, the size of the CRL may grow very large in a large enterprise with multiple branch offices.

A CRL is generated and published periodically at a defined interval. A CRL can also be published immediately after a certificate has been revoked. The CRL is issued by the authenticator which issues the corresponding certificates. All CRLs have a lifetime during which they are valid. During a CRL's validity lifetime, the CRL may be consulted by a PKI-enabled application to verify a certificate prior to use. The certificates for which a CRL should be maintained are often X.509/public key certificates.

A certificate authority (CA) can issue multiple certificates in the form of a tree structure. A root certificate is the top-most certificate of the tree, the private key of which is used to sign other certificates. The root certificate may be regenerated periodically, for example, on a yearly basis, to avoid the CRL growing to a very large size. The root certificate includes information, such as, how long a client device can be authenticated, when the certificate is updated for the client devices, etc. However, as a signing certificate, the root certificate does not include any detailed client information.

Based on the root certificate, a server certificate and a client certificate are generated accordingly. The server certificate includes both the root certificate and the CRL. The server certificate will be stored at the authentication server. The client certificate has the same root certificate and will be stalled on the client device.

B. Remote Authentication

Figure 3:
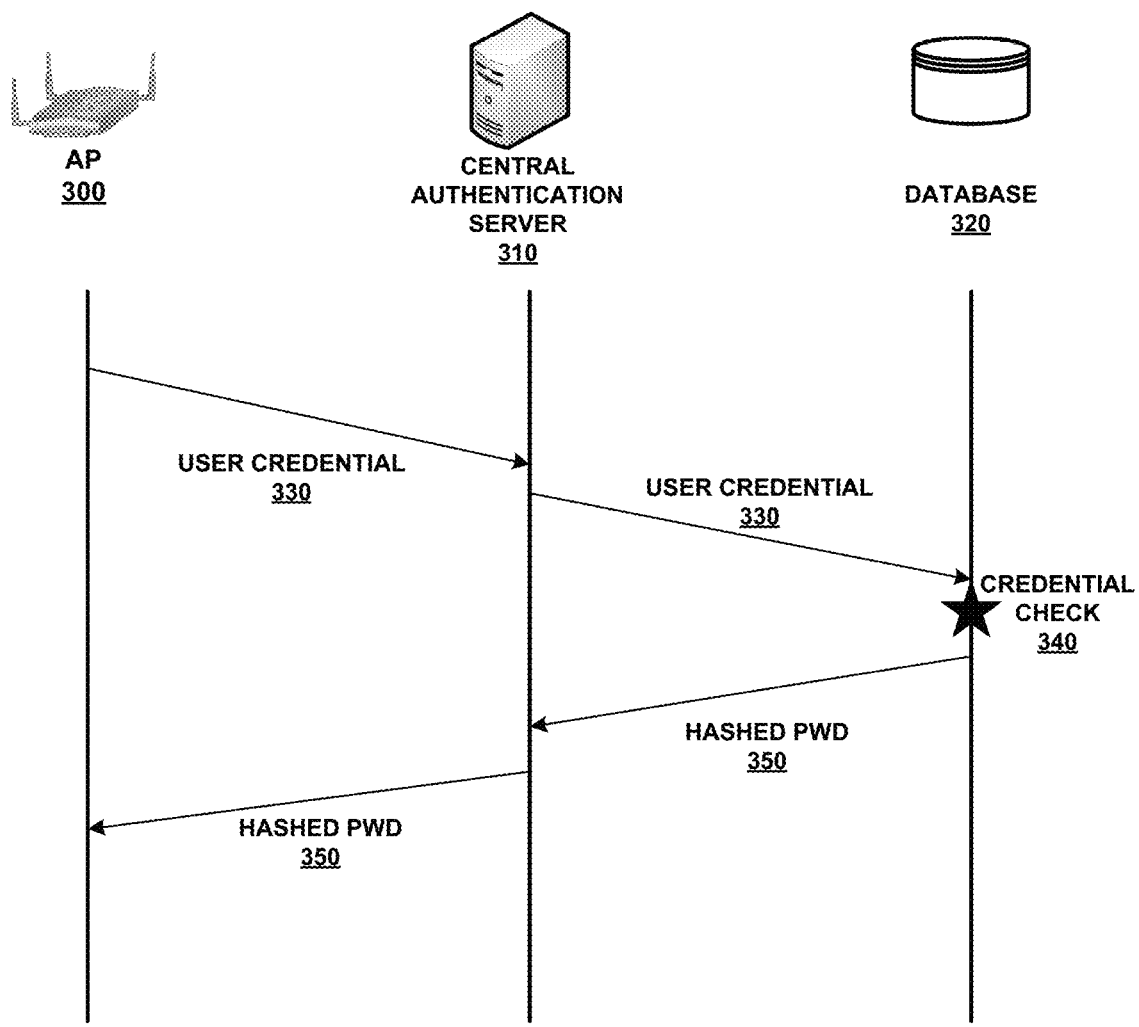
FIG. 3 shows a sequence diagram illustrating exemplary communication exchanges according to embodiments of the present disclosure.

FIG. 3 shows a sequence diagram illustrating exemplary communication exchanges during authentication with a remote authentication server according to embodiments of the present disclosure. FIG. 3 includes at least an AP 300, a central authentication server 310, and a database 320. Here, AP 300 may be located in a branch office that is remote from central authentication server 320.

When a client device is being authenticated, the client device presents a user credential 330 to AP 300. After AP 300 receives user credential 330 from a client device, AP 300 forward user credential 330 to central authentication server 320. Central authentication server 320 then sends user credential 330 to a database 320 that stores the server certificate. Database 320 may be internal or external to central authentication server 310. Then, authentication server 310 and/or database 320 will perform a credential check 340 to determine whether to authenticate the client device. For example, authentication server 310 and/or database 320 can compare the client certificate to the server certificate in order to determine whether the client device shall be authenticated. Specifically, authentication server 310 and/or database 320 may determine whether the root certificate portion of the server certificate and the client certificate matches and whether the client device's identifier is listed in the CRL of the server certificate. If the client device is successfully authenticated, database 320 and/or central authentication server 310 sends a hashed password 350 to AP 300, which will be forwarded to the authenticated client device.

C. Caching Authentication Credentials

According to embodiments of the present disclosure, during remote authentication process while the uplink connection is up, whenever the local authentication server receives a message indicating a successful authentication for a client device, the location authentication server extracts information of the client device from the certification, and stores the information locally.

The following example illustrates how to cache authentication credentials locally.

```
If (successfully authenticated by the external radius
    server) {
        Cache the username in AP's memory for a pre-
        configured timeout period.
} else /*authentication failure by central auth server*/
        Remove the cache information for this user from the
        AP.
}
```

Figures 4A, 4B:
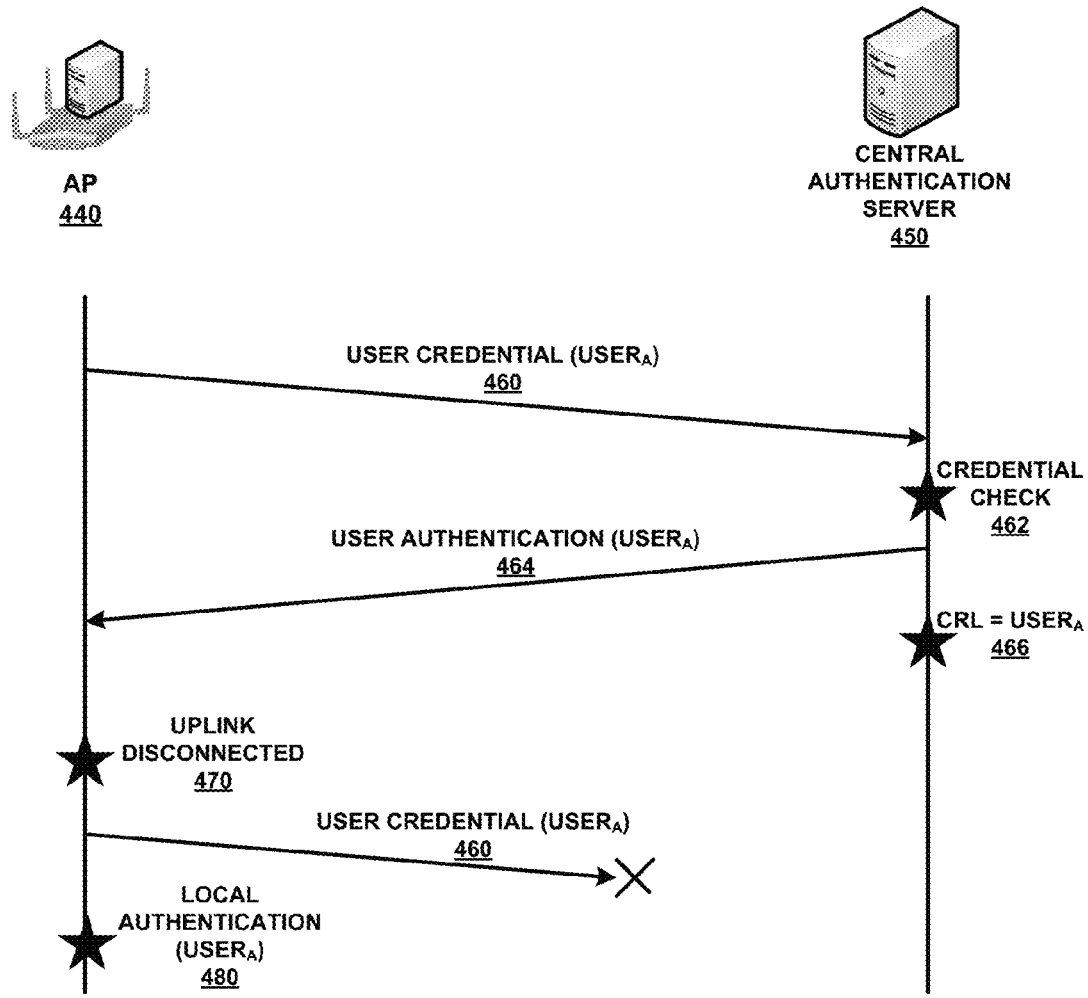
FIG. 4A illustrates an exemplary data scheme stored by a network device at a branch location according to embodiments of the present disclosure.
FIG. 4B illustrates a sequence diagram illustrating exemplary communication exchanges for determining whether to use a local authentication server according to embodiments of the present disclosure.

FIG. 4A illustrates an exemplary data scheme stored by a network device at a branch location according to embodiments of the present disclosure. As illustrated in FIG. 4A, the extracted and stored information (i.e., data stored at each branch 400) may include, but is not limited to, user name 410, hashed password 420, timestamp 430 indicating when the user is last successfully authenticated, etc.

Moreover, every time when a root certificate is regenerated, a new server certificate will be stored at the central authentication server. The new server certificate will have a limited size, because the size of CRL will be limited. Thus, the server certificate can be transmitted to an AP at a remote branch executing a local authentication server. Furthermore, because of the limited size of the server certificate, it is possible for the local authentication server to store the received server certificate locally. Note that, as more users are revoked over time, the CRL of the server certificate at the central authentication server will start to grow its size. However, subsequent CRL changes will not be transmitted to the local authentication server.

D. Local Authentication During Uplink Failures

FIG. 4B illustrates a sequence diagram illustrating exemplary communication exchanges for determining whether to use a local authentication server according to embodiments of the present disclosure. Specifically, FIG. 4B includes at least an AP 440 at a remote branch office and a central authentication server 450. Initially, the connection between AP 440 and central authentication server 450 is up. Thus, AP 440 can present user credential 460 of $User_A$ to central authentication server 450. Central authentication server 450 performs a credential check 462. If the authentication is successful, central authentication server 450 will send a message 464 indicating successful user authentication of $User_A$ to AP 440 at the branch office.

Assuming that, a network administrator then revokes $User_A$'s network access by adding $User_A$'s identifier to the CRL 466. Subsequently, AP 440's uplink to central authentication server 450 is disconnected (i.e., uplink disconnected 470). If $User_A$ attempts to be authenticated again with user credential 460, AP 440 will find that central authentication server 450 is unreachable. Unreachability is detected if a threshold number (e.g., a maximum of three attempts) of consecutive authentication requests are timed out.

AP 440 will then use the local authentication server running on AP 440 as the authentication server for local authentication 480 of $User_A$ while the uplink connection is down. The following example illustrates how to use the cached credentials to authenticate a user locally without using the CRL of the server certificate.

```
If (Central authentication server unreachable AND username
    is already cached in the AP) {
        Proceed with the normal authentication mechanism with
        the server certificate already present in the local
        authentication server running in AP.
} else {
        Do not allow this client.
}
```

The above-described local authentication mechanism ensures that, before processing the PEAP-TLS request, AP 440 at the branch office first checks whether the user name is already authenticated by central authentication server 450 and cached in AP 440. Only after verifying that the user name is previously authenticated will AP 400 perform the full PEAP-TLS authentication mechanism with its local authentication server.

Hence, the CRL check issue is solved by AP 440 caching the user names of the successfully authenticated users. If a user gets rejected from central authentication server 450 because user fails the CRL check, then the user name will not be cached in AP 440. Therefore, during the downtime of central authentication server 450, the user will not be able to get authenticated with the local authentication server running on AP 440, because of the first level check of the cached user name will reveal that the user name is not presented as a previously authenticated user on AP 440. Therefore, with the caching of user credentials, AP 440 can safely avoid the exchanging of the certificate content for every CRL check added to central authentication server 450.

Note that, a user is allowed to authenticate with the local authentication server during downtime of the central authentication server only if the user already authenticated at least once within the valid time period. As illustrated in FIG. 4A, each data entry stored at the local authentication server at the branch office includes a timestamp indicating the last successful authentication time for a particular user. A network administrator can configure a valid time period (e.g., 24 hours). The valid time period indicates the period after the last successful authentication during which a user can be authenticated with the same credential. If the valid time period expires, the user entry will be removed from the local authentication server, and the user will no longer be authenticated at the local authentication server during downtime of the central authentication server. In some embodiments, a timer preset with the valid time period is started or restarted upon each and every successful authentication for a particular user.

Moreover, while the network connection between AP 440 and central authentication server 450 is active, for each received authentication message indicating a failure of authentication, AP 440 checks its stored data to determine whether the corresponding user exists as a previously successfully authenticated user in the stored data. If so, AP 440 will remove the user entry from the previously authenticated users in the stored data.

E. Enhancement of Local Authentication

Assuming that $User_A$ has been successfully authenticated at time $t=t_0$ by central authentication server 450. Subsequently, at time $t=t_1$ ($t_1 > t_0$), CRL check has been added for the $User_A$ in central authentication server 450. Right after that, at time $t=t_2$ ($t_2 > t_1$), central authentication server 450 lost its connectivity to the branch where $User_A$ is present. Now, if $User_A$ wants to be authenticated at time $t=t_3$ ($t_3 > t_2$), then because the valid time period has not expired since the last successful authentication, $User_A$ will be authenticated by the local authentication server until the valid time period expires even though UserA has been added to the CRL check by central authentication server 450. Therefore, the valid time period potentially creates a security hole, if the connectivity between central authentication server and remote AP is lost when there has not been a failed authentication by central authentication server within the valid time period after the CRL check has been added for the user.

To solve this scenario, an enhanced local authentication mechanism can be utilized. Specifically, whenever a CRL has been added to the central authentication server's server certificate, a central management server will push the updated certificate including the newly added CRL to the APs at every branch. The APs at the branch offices will parse the received server certificate to obtain a list of users present in the CRL portion of the server certificate. The APs then can remove those users from its own cached list of previously authenticated users if present. Note that, the AP at the branch office does not need to store the updated server certificate, which may need a large amount of storage space that may not be available at the AP. Thus, next time when $User_A$ attempts to be authenticated, $User_A$ will be disallowed, because the user name will be removed from the cached list after the CRL update is received from central authentication server 450 by AP 440.

Process for Determining Whether to Use a Local Authentication Server

Figure 5:
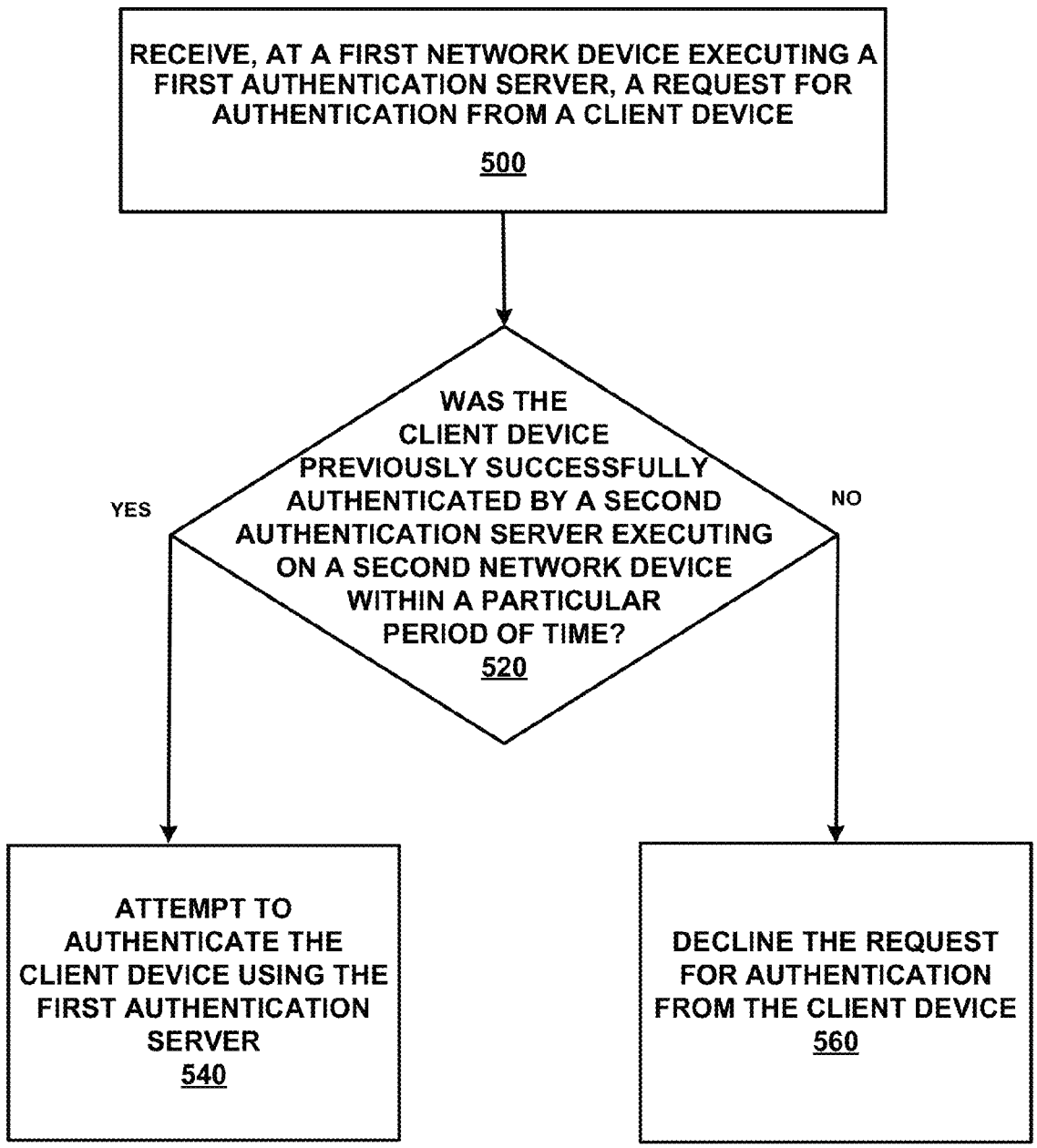
FIG. 5 illustrates an exemplary process for determining whether to use a local authentication server according to embodiments of the present disclosure.

FIG. 5 illustrates an exemplary process for determining whether to use a local authentication server according to embodiments of the present disclosure. During operations, a first network device executing a first authentication server receives a request for authentication from a client device (operation 500). The first authentication server then determines whether the client device was previously successfully authenticated by a second authentication server executing on a second network device within a particular period of time (operation 520). If so, the first authentication server at the first network device attempts to authenticate the client device using the first authentication server (operation 540). If not, the first authentication server at the first network device declines the request for authentication from the client device (operation 560).

In some embodiments, the first authentication server at the first network device attempts to authenticate the client device using the first authentication server in response to determining that the second authentication server is not reachable by the first network device. In some embodiments, the first network device is a first access point and the second network device is located remotely from the first access point. Specifically, the first network device is a first access point located at a first corporate office; and, the second network device is located at a second corporate office.

In some embodiments, the first authentication server at the first network device determines whether the client device was previously successfully authenticated by the second authentication server within the particular period of time by checking whether the client device is included in a list maintained by the first network device. The list identifies at least a portion of the devices authenticated using the first authentication server within the particular period of time. More specifically, the first authentication server at the first network device may check whether the client device is included in at least one of: (a) a first list maintained by the first network device, the first list identifying at least a first portion of the devices authenticated using the first authentication server within the particular period of time or (b) a second list maintained by a third network device, the second list identifying at least a second portion of the devices authenticated using the first authentication server within the particular period of time.

In some embodiments, the first network device further receives a previous request for authentication from the client device, and forwards the previous request for authentication from the client device to the second authentication server. Then, the first network device receives a notification from the second authentication server that the client device has been successfully authenticated, and stores information indicating that the client device was previously successfully authenticated by the second authentication server. The stored information may be used by the first network device to determine whether the client device was previously successfully authenticated by the second authentication server.

In some embodiments, the first authentication server attempts to authenticate the client device using a same authentication process as used by the second authentication server during the previous successful authentication, for example, EAP-TLS or MS-CHAPv2.

In some embodiments, the first network device attempts to authenticate the client device using the first authentication server in response to determining that the previous authentication of the client device by second authentication server has not been revoked.

System for Whether to Use a Local Authentication Server

Figure 6:
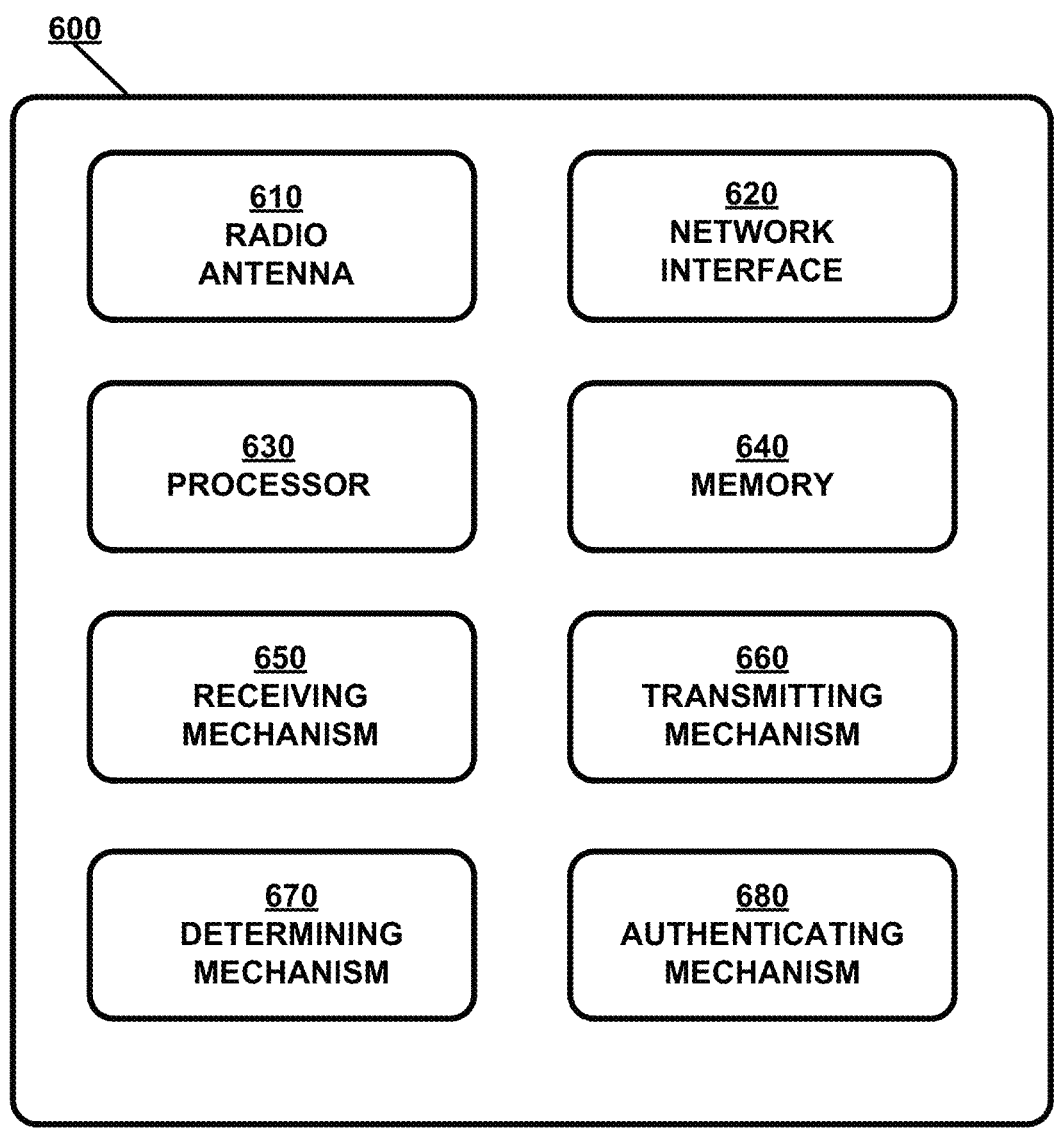
FIG. 6 is a block diagram illustrating an exemplary system for determining whether to use a local authentication server according to embodiments of the present disclosure.

FIG. 6 is a block diagram illustrating a system for determining whether to use a local authentication server according to embodiments of the present disclosure. Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, a determining mechanism 670, and an authenticating mechanism 680, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors.

Memory 640 can include storage components, such as, Dynamic Random Access Memory (DRAM), Static Random Access Memory (SRAM), etc. Specifically, memory 640 stores information indicating that the client device was previously successfully authenticated by the second authentication server. The stored information is used by the first network device to determine whether the client device was previously successfully authenticated by the second authentication server.

Receiving mechanism 650 generally receives one or more network messages via network interface 620 or radio antenna 610 from a wireless client. The received network messages may include, but are not limited to, requests and/or responses, beacon frames, management frames, control path frames, and so on. Specifically, receiving mechanism 650 receives a request for authentication from a client device. In some embodiments, receiving mechanism 650 can receive a previous request for authentication from the client device. In some embodiments, receiving mechanism 650 can receive a notification from the second authentication server that the client device has been successfully authenticated.

Transmitting mechanism 660 generally transmits messages, which include, but are not limited to, requests and/or responses, beacon frames, management frames, control path frames, and so on. In some embodiments, transmitting mechanism 660 forwards the previous request for authentication received by receiving mechanism 650 from the client device to the second authentication server.

Determining mechanism 670 generally determines whether a client device was previously successfully authenticated by a second authentication server executing on a second network device within a particular period of time.

In some embodiments, determining mechanism 670 determines whether the client device was previously successfully authenticated by the second authentication server within the particular period of time by checking whether the client device is included in a list maintained by the first network device, the list identifying devices, at least a portion of the devices authenticated using the first authentication server within the particular period of time.

In some embodiments, determining mechanism 670 determines whether the client device was previously successfully authenticated by the second authentication server within the particular period of time by checking whether the client device is included in at least one of: (a) a first list maintained by the first network device, the first list identifying devices, at least a first portion of the devices authenticated using the first authentication server within the particular period of time or (b) a second list maintained by a third network device, the second list identifying at least a second portion of the devices authenticated using the first authentication server within the particular period of time.

Authenticating mechanism 680 generally authenticates a client device using a first authentication server. Specifically, responsive to determining mechanism 670 determines that the client device was previously successfully authenticated by the second authentication server within the particular period of time, authenticating mechanism 680 attempts to authenticate the client device using the first authentication server. On the other hand, responsive to determining mechanism 670 determines that the client device was not previously successfully authenticated by the second authentication server within the particular period of time, authenticating mechanism 680 declines the request for authentication from the client device.

In some embodiments, authenticating mechanism 680 attempts to authenticate the client device using the first authentication server in response to determining mechanism 670 determines that the second authentication server is not reachable by the first network device. The first network device can be a first access point; and, the second network device may be located remotely from the first access point. In some embodiments, the first network device is a first access point located at a first corporate office; and, the second network device is located at a second corporate office.

In some embodiments, authenticating mechanism 680 at the first authentication server attempts to authenticate the client device using a same authentication process as used by the second authentication server during the previous successful authentication.

In some embodiments, authenticating mechanism 680 attempts to authenticate the client device using the first authentication server in response to determining that the previous authentication of the client device by second authentication server has not been revoked.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:

receiving, at a first network device, a request for authentication from a client device;

upon receiving the request, determining, by the first network device, whether the client device was previously successfully authenticated by a first authentication server executing on a second network device within a particular period of time, the previous successful authentication of the client device being in response to a previous request for authentication from the client device to the first network device that is forwarded by the first network device to the second network device for authentication, wherein determining whether the client device was previously successfully authenticated by the second authentication server within the particular period of time comprises checking whether the client device is included in a list maintained by a third network device executing a second authentication server, the list identifying at least a portion of the devices authenticated using the first authentication server within the particular period of time;

responsive to determining that the client device was previously successfully authenticated by the first authentication server within the particular period of time: attempting to authenticate the client device using the second authentication server; and responsive to determining that the client device was not previously successfully authenticated by the first authentication server within the particular period of time: declining the request for authentication from the client device;

self-selecting the third network as a virtual controller, wherein the third network device is a master access point (AP); and forwarding authentication information on the list from the third network device to the first network device, wherein the first network device does not maintain the list identifying at least a portion of the devices authenticated using the first authentication server within the particular period of time.

2. The method of claim 1, wherein attempting to authenticate the client device using the second authentication server is further responsive to determining that the first authentication server is not reachable by the first network device.

3. The method of claim 2, wherein attempting to authenticate the client device using the second authentication server includes attempting to authenticate the client device against authentication credentials associated with the client device that were cached at the second authentication server in response to the previous successful authentication.

4. The method of claim 1, wherein the first network device is a first access point and wherein the second network device is located remotely from the first access point.

5. The method of claim 1, wherein the first network device is a first access point located at a first corporate office and wherein the second network device is located at a second corporate office.

6. The method of claim 1, wherein determining whether the client device was previously successfully authenticated by the first authentication server within the particular period of time comprises checking whether the client device is included in the list maintained by the third network device, the list identifying devices, at least a portion of the devices authenticated using the second authentication server within the particular period of time.

7. The method of claim 1, wherein the method further comprising prior to the receiving operation:
receiving, at the first network device, the previous request for authentication from the client device;
forwarding, by the first network device, the previous request for authentication from the client device to the first authentication server;
receiving, by the first network device, a notification from the first authentication server that the client device has been successfully authenticated;
storing information indicating that the client device was previously successfully authenticated by the first authentication server.

8. The method of claim 7, wherein the stored information is used by the first network device to determine whether the client device was previously successfully authenticated by the first authentication server.

9. The method of claim 1, wherein the second authentication server attempts to authenticate the client device using a same authentication process as used by the first authentication server during the previous successful authentication.

10. The method of claim 1, wherein attempting to authenticate the client device using the second authentication server is further responsive to determining that the previous authentication of the client device by the first authentication server has not been revoked.

11. The method of claim 1, further comprising:
receiving, by the first network device and from the second network device, a revocation list of identifiers associated with client devices that are no longer trusted;
removing, by the first network device, client devices identified in the revocation list from the list maintained by the first network device.

12. A system comprising:
a first network device;
a second network device executing a first authentication server; and
a third network device executing a second authentication server,
wherein the first network device comprises:
a processing resource; and
a non-transitory computer-readable storage medium storing instructions that, when executed by the processing resource, cause the processing resource to:
receive, at the first network device, a request for authentication from a client device;
upon receipt of the request, determine whether the client device was previously successfully authenticated by the first authentication server within a particular period of time, the previous successful authentication of the client device being in response to a previous request for authentication from the client device to the first network device that is forwarded by the first network device to the second network device for authentication,
wherein determining whether the client device was previously successfully authenticated by the first authentication server within the particular period of time comprises checking whether the client device is included in a list maintained by the third network device, the list identifying at least a portion of the devices authenticated using the first authentication server within the particular period of time;
responsive to a determination that the client device was previously successfully authenticated by the first authentication server within the particular period of time: attempt to authenticate the client device using the second authentication server; and
responsive to a determination that the client device was not previously successfully authenticated by the first authentication server within the particular period of time: decline the request for authentication from the client device;
wherein the third network device comprises:
a processing resource; and
a non-transitory computer-readable storage medium storing instructions that, when executed by the processing resource, cause the processing resource to:
self-select the third network as a virtual controller, wherein the third network device is a master access point (AP); and
forward authentication information on the list from the third network device to the first network device, wherein the first network device does not maintain the list identifying at least a portion of the devices authenticated using the first authentication server within the particular period of time.

13. The system of claim 12, wherein the instructions to cause the processing resource to attempt to authenticate the client device using the second authentication server is further responsive to determining that the first authentication server is not reachable by the first network device.

14. The system of claim 12, wherein the first network device is a first access point and wherein the second network device is located remotely from the first access point.

15. The system of claim 12, wherein the first network device is a first access point located at a first corporate office and wherein the second network device is located at a second corporate office.

16. The system of claim 12, wherein the instructions to cause the processing resource to determine whether the client device was previously successfully authenticated by the first authentication server within the particular period of time includes instructions to check whether the client device is included in a list maintained by the first network device, the list identifying devices, at least a portion of the devices authenticated using the second authentication server within the particular period of time.

17. The system of claim 12, wherein the instructions further comprise prior to the receiving:
receiving, at the first network device, the previous request for authentication from the client device;
forwarding, by the first network device, the previous request for authentication from the client device to the first authentication server;
receiving, by the first network device, a notification from the first authentication server that the client device has been successfully authenticated;
storing information indicating that the client device was previously successfully authenticated by the first authentication server.

18. The system of claim 17, wherein the stored information is used by the first network device to determine whether the client device was previously successfully authenticated by the first authentication server.

19. The system of claim 12, wherein the second authentication server attempts to authenticate the client device using a same authentication process as used by the first authentication server during the previous successful authentication.

20. The system of claim 12, wherein instructions to attempt to authenticate the client device using the second authentication server is further responsive to determining that the previous authentication of the client device by the first authentication server has not been revoked.

21. The system of claim 12, wherein the first network device is at one of a plurality of branch offices and the second network device is located at a central office,
each branch office of the plurality of branch offices including a respective network device,
each respective network device including a corresponding hardware processor and a non-transitory computer-readable storage medium storing instructions to cause the corresponding hardware processor to:
receive, at the each respective network device, a request for authentication from a client device communicating with the each respective network device,
determine whether the client device communicating with the each respective network device was previously successfully authenticated within the particular period of time by the first authentication server executing on the second network device at the central office in response to a previous authentication request to the each respective network device from the client device communicating with the each respective network device, and
responsive to a determination that the client device in communication with the each respective network device was previously successfully authenticated by the first authentication server within the particular period of time: attempt to authenticate the client device using a authentication server of the each respective network device.

22. A non-transitory computer-readable storage medium storing instructions that, when executed by a processing resource, cause the processing resource to:
receive, at a first network device, a request for authentication from a client device;
upon receiving the request, determine whether the client device was previously successfully authenticated by a first authentication server executing on a second network device within a particular period of time, the previous successful authentication of the client device being in response to a previous request for authentication from the client device to the first network device that is forwarded by the first network device to the second network device for authentication,
wherein determining whether the client device was previously successfully authenticated by the first authentication server within the particular period of time comprises checking whether the client device is included in a list maintained by a third network device executing a second authentication server, the list identifying at least a portion of the devices authenticated using the first authentication server within the particular period of time;
responsive to a determination that the client device was previously successfully authenticated by the first authentication server within the particular period of time: attempt to authenticate the client device using the second authentication server; and
responsive to a determination that the client device was not previously successfully authenticated by the first authentication server within the particular period of time: decline the request for authentication from the client device;
self-select the third network as a virtual controller, wherein the third network device is a master access point (AP); and
forward authentication information on the list from the third network device to the first network device, wherein the first network device does not maintain the list identifying at least a portion of the devices authenticated using the first authentication server within the particular period of time.

* * * * *